Patented May 21, 1940

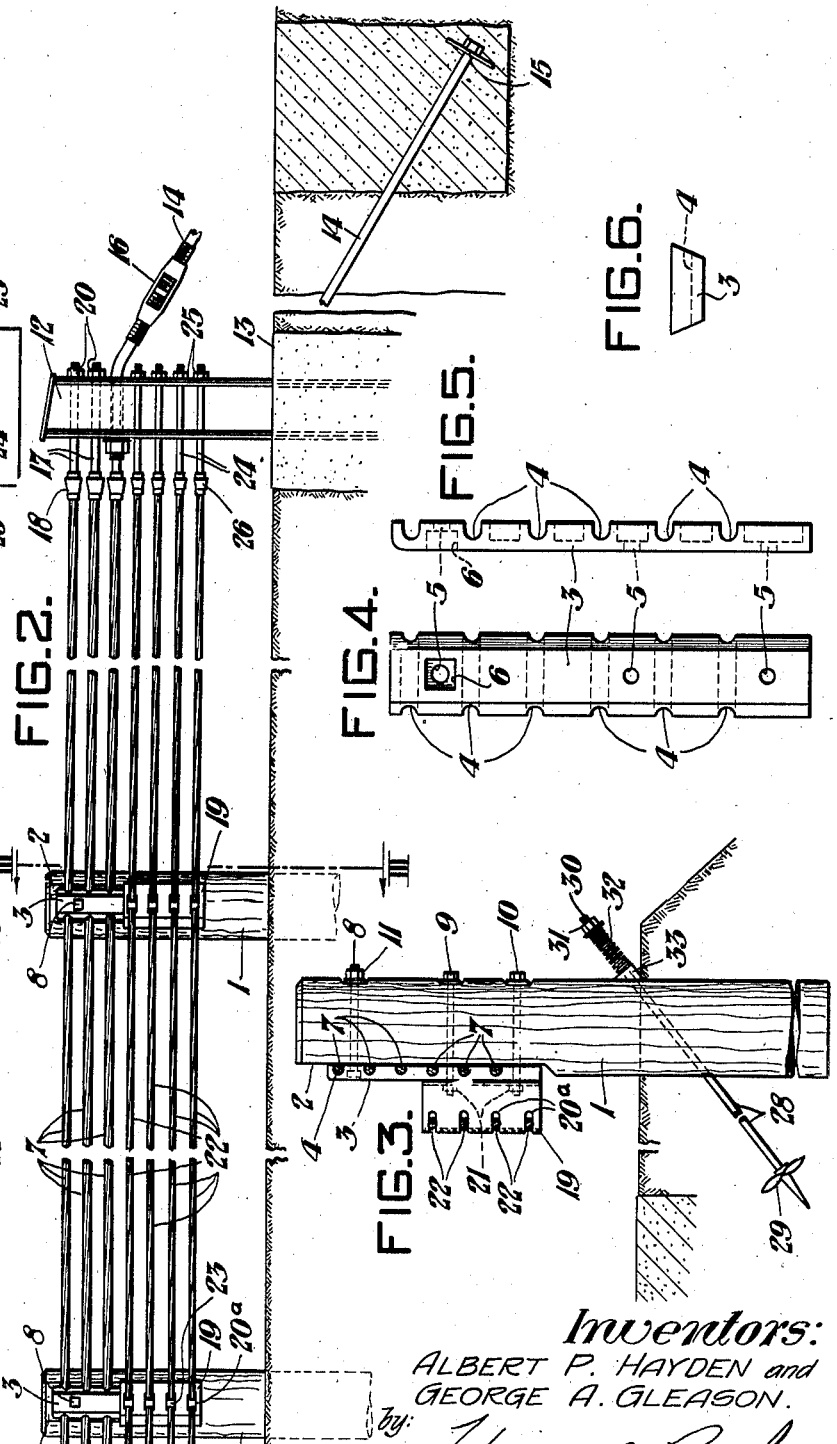

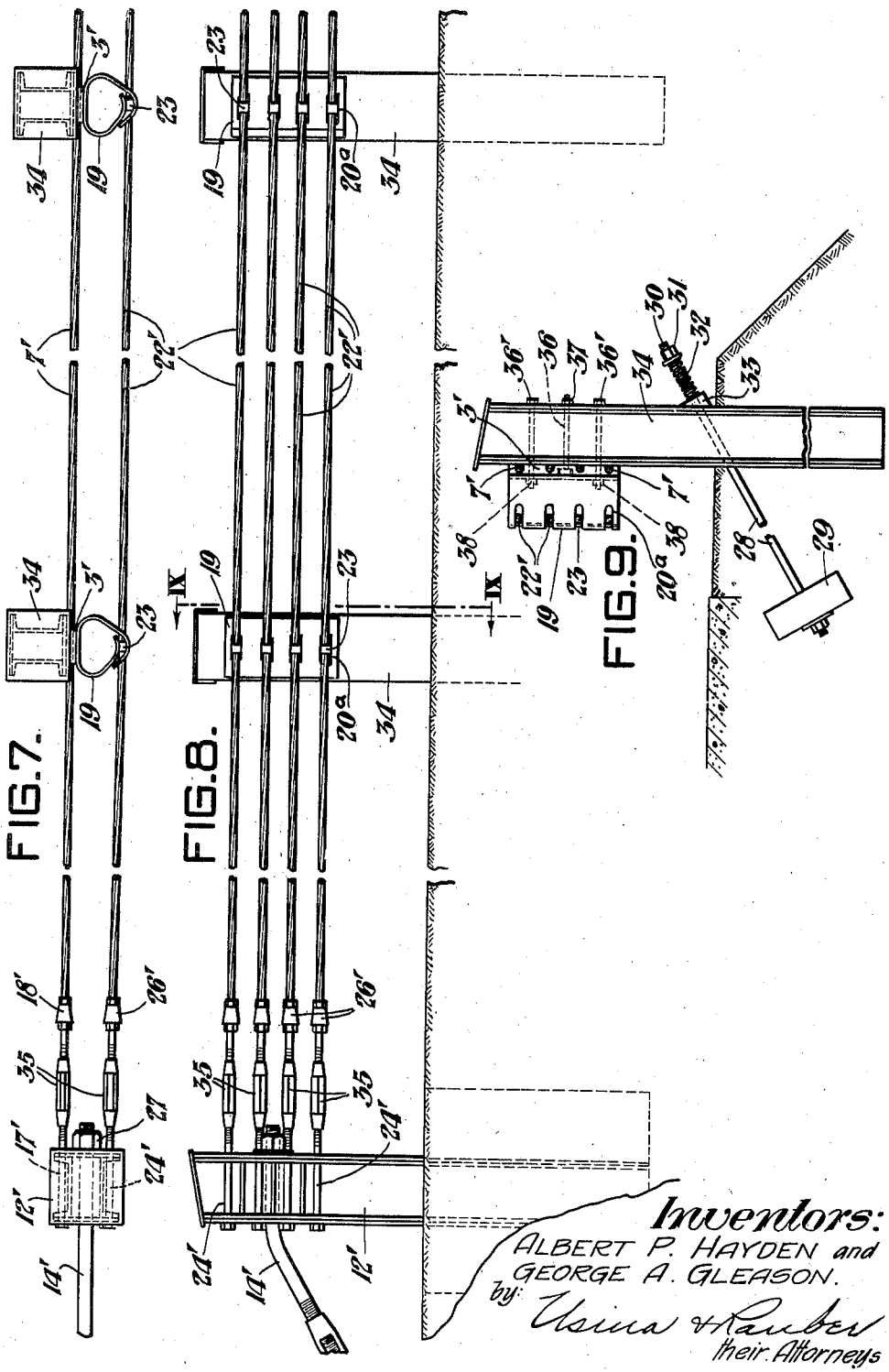

2,201,313

UNITED STATES PATENT OFFICE 2,201,313

REISSUED

TWO-PURPOSE HIGHWAY GUARDRAIL

Albert P. Hayden and George A. Gleason, Worcester, Mass., assignors to The American Steel and Wire Company of New Jersey, a corporation of New Jersey

APR 7 1942

Application December 10, 1936, Serial No. 115,228

5 Claims. (Cl. 256—13.1)

This invention relates to highway guardrails, and, more particularly, to such devices having means for deflecting or stopping heavy vehicles, such as, busses, trucks, and the like, as well as the lighter classes of passenger vehicles.

The highway guards in general use today are generally adapted to prevent automobiles, and other light vehicles, from leaving the highway, but they are of little effect in stopping heavy vehicles, such as, busses or trucks, when the latter collide therewith. Due to he vast amount of kinetic energy that the heavier vehicles develop in running at any speed, the ordinary guardrail is insufficient to stop or deflect them.

It is the primary object of the present invention to provide a guardrail that will combine the sufficient strength and construction necessary for stopping heavy vehicles, with the construction and resilience desired for the deflection of the average light passenger vehicle.

It is another object to provide a guardrail of the class described, wherein none of the desirable features of the present-day type of guardrails will be sacrificed, while, at the same time, greatly increasing the strength of the guardrail over the latter.

With the above objects in view, and others ancillary thereto, the invention will be more readily understood by reference to the following specification when considered in conjunction with the accompanying drawings.

In the drawings:

Figure 1 is a plan view illustrating one form of the invention.

Figure 2 is a front elevational view of the construction shown in Figure 1.

Figure 3 is a sectional view taken along line III—III in Figure 2.

Figures 4, 5, and 6 are front and side elevational and end views, respectively, showing in detail one of the elements employed in the construction of the present invention.

Figure 7 is a plan view of a modified form of the invention.

Figure 8 is a front elevational view of the device shown in Figure 7.

Figure 9 is a sectional view taken along line IX—IX in Figure 8.

Referring more specifically to the drawings, in which like reference characters refer to like parts throughout:

The embodiment of the invention illustrated in Figures 1 through 3, is comprised of a plurality of supports, or posts, 1, having flatted portions 2 disposed to face the highway. Secured against each of these flatted portions is a clamp, or retainer block, 3, that is shown in detail in Figures 4, 5 and 6. Each of these clamps, or retainer blocks, is provided with a plurality of cable-receiving apertures 4 that extend transversely thereof for disposition against the flatted portions 2 of the posts 1. The clamps, or retainer blocks, are provided with bolt holes 5, the uppermost of which is provided with a squared countersunk portion 6, for reasons to become apparent hereinafter.

A plurality of heavy cables 7 is disposed across the posts adjacent the flatted portions 2 thereon, and is secured to each post by means of the clamps, or retainer blocks, 3. The cables 7 lie, respectively, within each of the receiving apertures 4, and are then clamped to the flatted portions of the posts by means of bolts 8, 9 and 10, which are disposed through the bolt holes 5 in the retainer block, and through the posts to the opposite side thereof. The uppermost bolt 8 is provided with a squared head that is adapted to seat within the squared countersunk portion 6 of the adjacent bolt hole 5, and its threaded end is extended to the rear of the post where it is provided with a suitable nut 11 for tightening the clamp, or retainer block, 3 against the post.

The cables 7 are anchored at their opposite ends to suitable posts 12 that are preferably set in concrete base 13, and braced by means of a diagonal rod 14 extending away therefrom, substantially in the plane of the guardrail to a point of anchorage a substantial distance below the ground, as is represented at 15. The brace rod 14 may be broken intermediate its ends and provided with a turnbuckle 16, or any other suitable device, for increasing or decreasing the tension to which it is subjected. The cables 7 are secured to the post 12 by means of bolts 17, having cable-engaging sockets 18 at one of their ends, and a nut 20 at the opposite ends on the outside of post 12, whereby the tension on cables 7 may be varied.

Carried upon the outer face of each of the clamps, or retainer blocks, 3, is a resilient cable spring bracket 19, of a type similar to that disclosed in a co-pending application for United States patent, of Carl C. Ahles, Serial No. 30,374, filed July 8, 1935. These resilient brackets are formed of a sheet of resilient plate metal arranged to dispose its opposite ends in overlapping relation, and with the outer overlapping portion being provided with a plurality of cable-receiving slots 20ª. The rear side of each of these brackets is of a shape as will conform to the outer face of the retainer blocks 3, and in which are disposed bolt-receiving openings to overlie the lowermost bolt-receiving openings 5 in each of the retainer blocks 3. The brackets 19 are secured against the retainer blocks and are thereby held to the posts by means of the bolts 9 and 10, which are disposed through the lower bolt openings 5 in the retainer blocks, and through the registering openings in the brackets 19 provided to receive the same. Nuts 21 are disposed on the threaded end of the bolts 9 and 10, which extend inwardly of the brackets, and by means of which the retainer blocks, brackets, and posts are secured rigidly together.

Disposed to extend across all of the brackets 19 is a plurality of cables 22, each of which is arranged to lie, respectively, within each of the slots 20ª in the brackets, wherein they are secured by means of a wedge or pin member 23. The cables 22 are likewise secured at their free ends to the posts 12 by an arrangement similar to that already described in connection with the cables 7. Arranged in the same manner as the bolts 17 are the bolts 24 disposed with their threaded ends outwardly of the post 12 and having nuts 25 screwed thereon for varying the longitudinal disposition of the bolts. The inner ends of the bolts 24 are provided with sockets 26 for engaging the cables 22, whereby the latter are made fast to the bolts, and may be adjusted longitudinally by setting the nuts 25.

The post 12 is preferably in the form of a heavy I-beam disposed with the plane of its web substantially within or parallel to the general plane of the highway guard assembly. The bolts for the cables 7 are preferably disposed through holes placed in axial alignment upon each of the flanges at one side of the web. The bolts for the cables 22 are preferably disposed upon the opposite side of the web in holes similarly provided therefor. This arrangement permits the nuts 20 and 25, that are employed for securing the bolts 17 and 24, respectively, to the posts 12, to be disposed on the side of the posts 12 remote from the guard rail proper so that the entire tensional strains inherent in the latter, and others which arise from vehicular impact, are afforded the resistance of the entire cross sectional strength of the posts 12. To augment the resisting strength of the post, a brace 14, disposed as has already been described, is introduced through the web portion thereof, intermediate cable bolts 17 and 24. The inner end of the brace is threaded and provided with a heavy nut 27, which bears upon the face of the post 12 adjacent the guardrail proper and prevents withdrawal of the brace 14.

Since the supporting posts are frequently mounted along the upper edge of embankments without much earth in back of them to support them, it is desirable to provide additional means for strengthening the resistance of the posts against dislodgment from the earth. In accordance with the present invention, this means may take the form of an anchor rod 28 extending diagonally through the post from a point at its rear adjacent the ground level, to a point of anchorage 29 considerably below and adjacent to the highway, substantially as is shown in Figure 3. The exposed end of the anchor rod 28 preferably extends a considerable distance above the ground and beyond the rear face of the post 1 in order that its threaded terminus 30 may be provided with a hex nut 31 for varying the tension of a compression spring 32 disposed about the shank of the exposed portion of the rod 28. The compression spring 32 is afforded bearing against the rear of the post by a bearing member 33 which is provided with one face perpendicular to the axis of the spring 32 and another face canted to coincide with the post as the angularity of the rod requires. By adjusting the nut 31 the spring 32 is placed under more or less tension, whereby a greater or less degree of resistance to dislodgment is afforded the post 1. Also, the springs 32 will permit the posts to yieldingly resist severe impacts of a magnitude sufficient to partially dislodge the latter, and thus overcome the objections of an absolutely immovable barrier, which, by virtue of its immobility, can cause considerable damage to a vehicle colliding therewith.

A road guard constructed in accordance with the above description will be provided with two barriers: that comprised of the cables 7, and that comprised of the cables 22. It will be appreciated that the cables 22, being spaced resiliently from the posts, are adapted to function in the usual manner for deflecting vehicles of the lighter classes. To this end, the cables 22, and the brackets 19 are disposed at the height customarily adopted for engaging automobiles substantially at the level of the hubs of their wheels. However, in the case of busses, trucks, etc., the centers of gravity are considerably higher than in the smaller, lighter vehicles, necessitating that the cables 7, in order to be effective in stopping a colliding bus or truck, be placed considerably higher than the cables 22. If wooden posts are employed, it is contemplated that they should be at least 12 inches in diameter and set deep in the ground, whereby adequate support is afforded the deflecting cables 22 and 7, and, more particularly, the latter.

The embodiment shown in Figures 7, 8 and 9, is substantially the same as that described above except that the two sets of cables, identified as 7' and 22', are placed in substantial horizontal alignment. Also, in lieu of the wooden posts 1, metal posts 34, of a construction similar to that of the end posts 12, described above, are employed. End posts 12' are similar to those already described in that the arrangement of the cable securing bolts 17' and 24', respectively, are positioned through the flanges extending to each side of the center web of posts 12'. Cable sockets 18' and 26' are likewise provided for securing the cables to the end posts. The main difference is the provision of turnbuckle unions 35 intermediate the cable sockets and the end posts 12' for varying the tension in the cables 7' and 22'. A brace 14' is provided for the post 12' in a manner similar to that already described. The brackets 19, for attaching the cables 22' to the posts, are, in the embodiment shown in Figures 7, 8 and 9, coextensive with the retainer blocks 3'. Referring more specifically to Figure 9, it will be seen that the retainer blocks 3' are held to the posts 34 independently of the brackets 19 by means of bolts 36 extending through the posts and secured thereto by nuts 37. The brackets 19 are retained on the front faces of the retainer blocks 3' by means of bolts 36' passing through the posts and retainer blocks. The bolts 36' are disposed to introduce their threaded portions within the brackets 19, whereon nuts 38 are screwed so as to secure the bracket, retainer plates, and posts, rigidly together.

Post anchors similar to those illustrated in Figure 3 and described above, may be provided for use in conjunction with the metal posts as is shown in Figure 9 wherein the same reference numerals apply in like manner as to the construction of Figure 3.

It will be understood that, whereas, certain types of fence posts have been specified herein, the invention is by no means limited thereto. In lieu of the I-beam construction specified, a built-up channel construction could as well be employed. This would eliminate the necessity of boring through the I-beam web to accommodate the brace rods 14—14' in the case of the end posts 12—12', since the channel elements in a built-up channel post could be spaced the requisite amount to accommodate the brace rod. Wooden posts of stout construction could be employed instead of the metal end posts 12—12', although, in view of the number of perforations necessary, metal posts are preferred. In short, any suitable support or supports are considered to fall within the scope of the present invention, which is in no way limited to the precise constructions shown.

Still other modifications may be made without departing from the spirit of the invention, and though certain elemental details have been adopted herein for illustrative purposes, it is not contemplated that we shall be limited thereto, except insofar as is consistent with the recitations of the appended claims.

We claim:

1. In a highway guard, a post, a retainer block having barrier receiving recesses secured to said post, a spring bracket seated upon a face of said retainer block remote from said post, and means on said bracket for securing a barrier in spaced relation to said post.

2. In a highway guard, a post, a retainer block having cable receiving recesses secured to said post, a spring bracket set upon a face of said retainer block remote from said post, and means on said bracket for securing a barrier in spaced relation to said post.

3. In a highway guard, a post, a clamp having means for securing a cable to said post, a spring bracket seated upon a portion of said clamp, and means on said bracket for securing a cable in spaced relation to said post.

4. In a highway guard, a post, a retainer block having barrier receiving recesses carried by said post, a spring bracket seated upon a portion of said retainer block remote from said post, and fastening devices passing through said retainer block, bracket and post to secure them rigidly together.

5. A road guard including spaced posts inserted in the ground, a guardrail mounted by said posts through relatively inelastic elements and means for elastically restraining displacement of said posts independently of their restraint by reason of their insertion in the ground, said road guard being further characterized by including a second guardrail mounted by said posts in front of the first named guardrail through offset spring brackets.

ALBERT P. HAYDEN.
GEORGE A. GLEASON.